(12) United States Patent
Claessen

(10) Patent No.: US 8,717,346 B2
(45) Date of Patent: May 6, 2014

(54) APPARATUS AND METHODS FOR COMMUNICATING WITH A LOW DUTY CYCLE WIRELESS DEVICE

(75) Inventor: Albert M. G. Claessen, Oakwood, GA (US)

(73) Assignee: NCR Corporation, Duluth, GA (US)

( * ) Notice: Subject to any disclaimer, the term of this patent is extended or adjusted under 35 U.S.C. 154(b) by 2618 days.

(21) Appl. No.: 11/302,546

(22) Filed: Dec. 13, 2005

(65) Prior Publication Data

US 2007/0132751 A1    Jun. 14, 2007

(51) Int. Cl.
*G09G 5/00* (2006.01)
(52) U.S. Cl.
USPC .............. 345/211; 345/212; 345/55; 345/87
(58) Field of Classification Search
USPC ...................... 345/211–212, 55, 87
See application file for complete search history.

(56) References Cited

U.S. PATENT DOCUMENTS

| | | | | |
|---|---|---|---|---|
| 5,218,399 A | * | 6/1993 | Izumi et al. | 396/292 |
| 2001/0028301 A1 | * | 10/2001 | Geiger et al. | 340/5.91 |
| 2001/0048363 A1 | * | 12/2001 | Trosper | 340/571 |
| 2003/0053014 A1 | * | 3/2003 | Niiyama et al. | 349/106 |
| 2006/0077036 A1 | * | 4/2006 | Roemerman et al. | 340/5.61 |

* cited by examiner

*Primary Examiner* — William Boddie
*Assistant Examiner* — Leonid Shapiro
(74) *Attorney, Agent, or Firm* — Peter H. Priest

(57) ABSTRACT

A low duty cycle wireless device is disclosed. The low duty cycle wireless device includes a high data rate transceiver, a low data rate receiver, and a microprocessor. The low data rate receiver receives a command to receive a large amount of information. The display information far exceeds the capacity for reception through the low data rate receiver. In response to the received command, the microprocessor wakes up from a sleep mode and activates the high data rate transceiver to receive the display information. The microprocessor deactivates the high data rate transceiver once the display information has been received.

20 Claims, 4 Drawing Sheets

APPARATUS AND METHODS FOR COMMUNICATING WITH A LOW DUTY CYCLE WIRELESS DEVICE

FIELD OF THE INVENTION

The present invention generally relates to apparatus and methods for communicating with a low duty cycle wireless battery powered device, and more particularly, to advantageous apparatus and methods for reducing the amount of time the wireless device is powered on in order to receive updates of new information and, consequently, reducing average power consumption and conserving power.

BACKGROUND OF THE INVENTION

Battery powered electronic shelf labels (ESLs) often must operate several years on one battery charge. Typically, conventional ESLs include a dedicated segmented liquid crystal display (LCD) which displays limited information such as the price of an item and the item's unit cost. As a result of displaying limited information, conventional ESLs include a low duty cycle, low power and low data rate receiver to receive a few hundred bits at a time in order to update the information at an ESL. To conserve power, the low data rate receiver typically remains powered off and periodically wakes up to receive a beacon signal at which point it determines whether to remain powered in order to receive subsequent updated information.

Due to the limited amount of displayable information of a segmented LCD, a conventional ESL has limited use for displaying advertising information such as specials, graphics, and the like. Conventional dot matrix displays, on the other hand, are capable of displaying more information which would be more suitable for advertising. For example, dot matrix displays may display graphics, colored graphics, colored text of varying styles and fonts, and other attractive information. However, the amount of information that is required to update a dot matrix display may require tens of thousands of bits for one update. For example, a low end, 320×240 pixel video graphics array (VGA) single color dot matrix display presently requires 76,800 bits for one update whereas a segmented LCD only requires a few hundred bits for one update. Utilizing the low data receiver approach to updating, the dot matrix display would have to be powered on for periods of time much longer than a conventional LCD, resulting in a high amount of power consumption.

One approach to satisfying large data rates of transmission required by a dot matrix display in an ESL or an advertising display may include employing a conventional high bandwidth transceiver such as I.E.E.E. 802.11, Bluetooth®, and Zigbee® transceivers. To conserve power in order for the ESL or advertising display to operate a long time on one battery charge, the conventional high bandwidth transceivers would have to operate at a very low duty cycle, for example, awaking from a sleep mode once every ten minutes. Retailers, who deploy ESLs and advertising displays, require that the response time for updating information be performed preferably within seconds of initiating an update. As a result, an ESL or advertising display utilizing the conventional high bandwidth transceiver must wake up periodically in small second increments to determine whether an update has been initiated. Conventional high bandwidth transceivers are burdened by multiple packet exchanges to determine whether an update has been initiated. Furthermore, multiple packet exchanges are also required by conventional high bandwidth transceivers to remain synchronized with a far end device to which it communicates. Thus, conventional high bandwidth transceivers, employed in this way, waste considerable power as compared to a conventional ESL.

SUMMARY OF THE INVENTION

The present invention recognizes the need to address problems of integrating a dot matrix display to a low duty cycle wireless device such as an electronic shelf label or advertising display. To such ends, a dual mode low duty cycle wireless device to drive a dot matrix display is disclosed. In one mode of communication, the low duty cycle wireless device utilizes a low power and low data rate receiver to determine whether display information is to be received from a host system such as a point of sale (POS) system. Once this determination has been made, the low duty cycle wireless device operates in a second mode of communication. In the second mode of communication, the low duty cycle wireless device utilizes a conventional higher data rate transceiver to receive the display information required by the dot matrix display. The present invention advantageously has the power conservation benefits of a low data rate receiver for passively acknowledging commands, as well as, with the throughput benefits of receiving large amounts of information as required by a dot matrix display with a high data rate transceiver.

A more complete understanding of the present invention, as well as further features and advantages of the invention, will be apparent from the following Detailed Description and the accompanying drawings.

DETAILED DESCRIPTION

Figure 1:
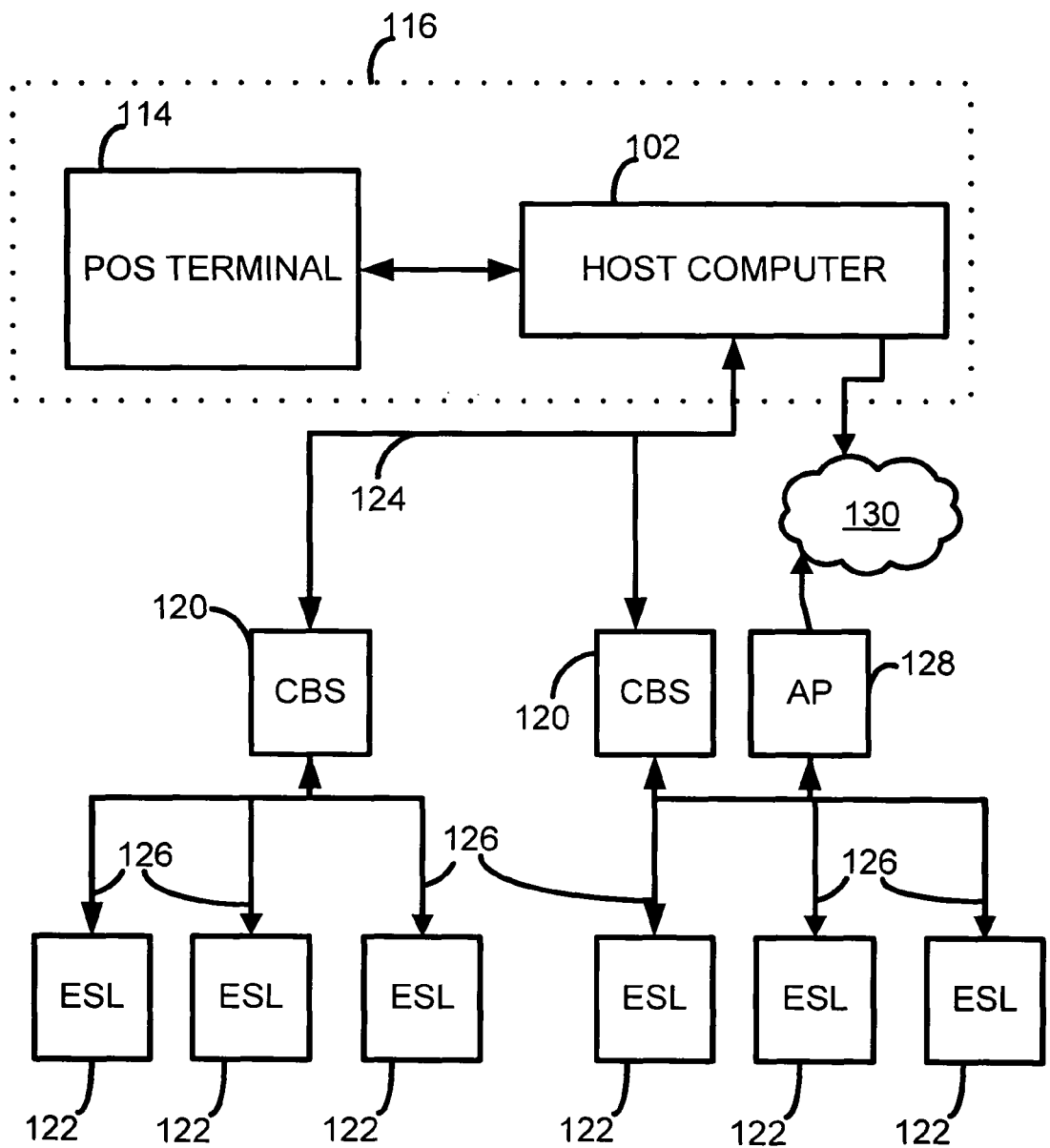
FIG. 1 shows a block diagram of a transaction management system in which the present invention may be advantageously employed.

FIG. 1 shows a transaction management system 100 employing ESLs 122 in accordance with the present invention. The system 100 includes an ESL host computer system 102 and a point-of-sale (POS) terminal 114. Here, components 102 and 114 are shown as separate components that are networked together, but they and their subcomponents may also be combined or divided in various ways to compose a POS system 116.

The system 100 also includes communication base stations (CBSs) 120 and ESLs 122. ESLs 122 are an example of a low duty cycle wireless device in accordance with the present invention and described in further detail in connection with the discussion of FIG. 2. The CBSs 120 may be suitably mounted in or near the ceiling of the retail establishment. ESLs 122 are typically attached to store shelving adjacent to items. In one aspect, the system 100 includes a plurality of groups of ESLs 122 and a plurality of CBSs 120, with each group of ESLs 122 preferably assigned to one of the CBSs 120.

The system 100 also includes access point (AP) 128. As will be described in further detail in connection with the discussion FIG. 2, ESLs 122 have a high data rate transceiver which communicates with host computer 102 over a different protocol, such as I.E.E.E. 802.11, than a passive backscatter technique conventionally employed in a conventional ESL. AP 128 supports the high data rate protocol and communicates with host computer 102 over a wireless local area network (LAN) 130. Alternatively, AP 128 may communicate with host computer 102 over either wired network 124, a wired LAN, or a separate wired network. Alternatively, the teachings of the invention contemplate integrating the access point functionality in a CBS.

The host computer system 102 records and schedules messages, such as price updates, to ESLs 122. The ESL host computer system 102 monitors and maintains an action list for the ESLs 122. Items or records on the action list may be provided from a user of the POS system 114 or host computer 102. Based on the messages the ESL host computer system 102 has scheduled for an ESL 122, the ESL host computer system 102 creates the appropriate message and sends the message to an appropriate CBS 120. The message may originate from one of two classes of messages. The first class includes a beacon message to synchronize the clocks of the ESLs or to inform a particular ESL that display information requires updating. The second class includes display information updates.

The messages are sent to the CBSs 120 through communication links 124. The communication links 124 may suitably utilize radio frequency (RF) communication, infrared (IR) communication, or some combination of communication techniques. Groups of ESLs 122 are assigned to a particular CBS for communication. After receiving a message from the host system 102, a particular CBS 120 which has been assigned to an ESL 122 then transmits the message to the ESL 122 utilizing communication link 126, which may suitably utilize RF communication, IR communication, or some combination of communication techniques. Processing of the two classes of messages will be described in further detail in connection with the discussion of FIG. 2.

Figure 2:
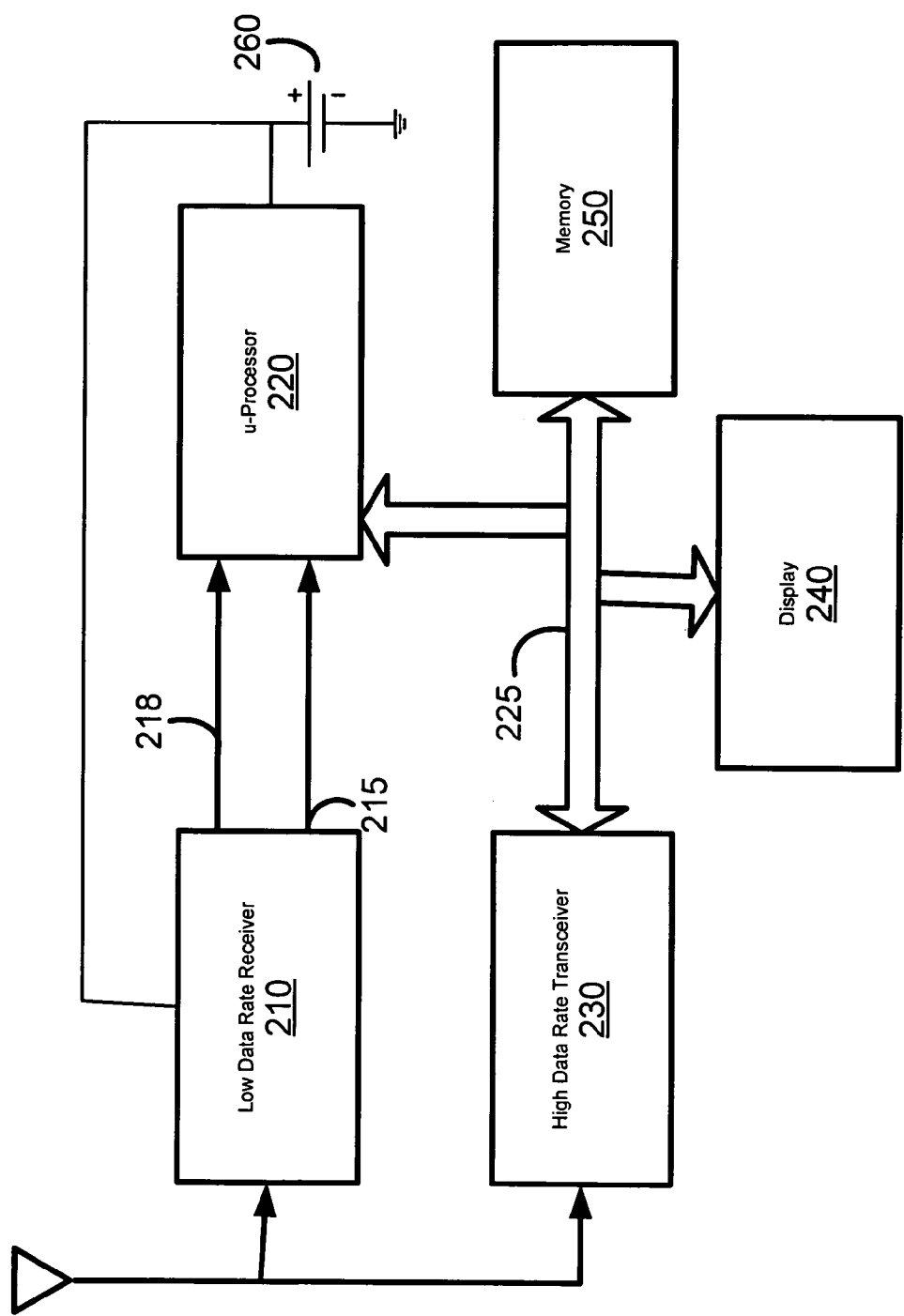
FIG. 2 shows a low duty cycle wireless device in accordance with the present invention.

FIG. 2 shows a low duty cycle wireless device 200 in accordance with the present invention. Low duty cycle wireless device 200 may suitably be used as one or more of the ESLs 122. Low duty cycle wireless device 200 includes a low data rate receiver 210, a high data rate transceiver 230, a microprocessor 220, a persistent memory 250, a dot matrix display 240, and a battery 260. The low data rate receiver 210 may be a conventional low duty cycle, low power receiver which employs a conventional passive backscatter technique. The high data rate transceiver 230 may be a conventional high data rate transceiver such as an IEEE 802.11 receiver modified according to the teachings of the present invention. The microprocessor 220 may be any suitable microprocessor having a stand by mode in which it consumes a few microamperes (μA) and can be activated or awakened in a few microseconds. One microprocessor family suitable for this kind of operation is the Texas Instruments MSP430 series of microprocessors, for example. The battery 260 is coupled to the microprocessor 220 and the low data rate receiver 210. The microprocessor 220 applies power to the high data rate transceiver 230, display 240, and memory 250 over communication bus 225 as needed.

The persistent memory 250 is random access memory (RAM). Flash memory and any other memory types which can persistently store data without having power applied are preferable. The display 240 may be any suitable bi-stable display such as cholesteric LCD (ChLCD) manufactured by Kent Displays Inc., bi-stable displays manufactured by ZBD Displays Ltd, Plastic Logic's electronic paper, or the like, which require a high rate of data for achieving an update, or any suitable type of low power consumption dot matrix display. A bi-stable display continues to display information such as on-screen images and text even after the power has been turned off to the display. The display utilizes power only when display information changes.

In a normal mode of operation, the low data rate receiver 210 wakes up from a sleep mode approximately every 1.45 seconds to receive a beacon message. In this mode, the low data rate receiver 210 consumes little power on the order of 2 μper cycle or 6 μwatts (μW) on average. The beacon message normally serves as a time synchronization point where the low data rate receiver 210 wakes up, synchronizes its internal logic, and returns to sleep mode. The instantaneous data rate for the low data rate receiver 210 is approximately 16 kilobits per second. However, considering that the low data rate receiver 210 is awaken every 1.45 seconds, the effective data rate is approximately 300 kilobits per second.

If there is an action to be performed such as updating display 240 with display information, such as an update of text, graphics, fonts, styles, colors, and the like, the beacon message will contain address and data components. The address component identifies the particular ESL for which the data components are destined. The data component includes a command and data portion relating to the command. The low data rate receiver 210 utilizes a conventional passive backscatter technique to acknowledge the command. When an action is to be performed, the low data rate receiver 210 communicates a clock or any suitable type of interrupt signal to microprocessor 220 over link 218.

The low data rate receiver also forwards the command and data portions over serial port 215 to microprocessor 220. Microprocessor 220 wakes up from sleep mode, synchronizes its clock, and processes the command portion accordingly. For a command indicating that display 240 is to be updated, for example, the command portion directs data in the beacon message to serial output 215 of the low data rate receiver 210. In an alternative embodiment, link 218 may combine with serial output 215 into one signal wire. In this alternative, a change in state or signal transition can be used to activate microprocessor 220 until the command is received.

Microprocessor 220 wakes up and processes the command portion. When processing the command portion, microprocessor 220 recognizes that an update to display 240 is being requested from host computer 102. Microprocessor 220 signals the high data rate transceiver 230 over communication bus 225 to wake up and start communication with host computer 102 to receive display information. The high data rate transceiver 230 may utilize any communication protocol as long as its data rate is substantially higher than the low data rate receiver 210 and serves the purpose of conserving the average power consumption of the low duty cycle wireless device 200. The lowest communication rate for transceiver 230 is dependent on the amount of information needed to update display 240 and being able to update display 240 with that amount of information in a few milliseconds. On smaller screen sizes, such as 320×240 pixel display, a transceiver operating at least at 250 kilobits per second and consuming approximately 0.5-1 Watts of power would be sufficient. To consume less power when receiving display information, data rates in the order of megabits per second are preferable. One exemplary protocol meeting these criteria is the I.E.E.E. 802.11 protocol.

The high data rate transceiver 230 receives the display information from host computer such as host computer 102 through network 130 and forwards the display information to persistent memory 250 for storage. The persistent memory 250 stores display information so that it can be subsequently retrieved without having to re-receive the same display information. Upon completion of receiving the display information, microprocessor 220 awakes display 240 and updates display 240 with the display information stored in persistent memory 250. Display 240 displays the updated display information. Once the display information is displayed, microprocessor 220 signals display 240 to power off and places itself into sleep mode to await the next command. Since display 240 is a bi-stable display, the information displayed remains displayed even after power to display 240 is turned off.

Although the low data rate receiver 210 and the high data rate transceiver 230 are depicted as separate components, it should be recognized that these components may be integrated into a single component consistent with the teachings of the present invention.

To enhance the advertising aspect, display 240 may have a larger screen size than a conventional LCD ESL. For example, the screen size of display 240 may measure 5"×7" as compared to 1"×2" of the conventional LCD ESL. With this sized screen, more attractive advertising information may be displayed and can be viewed from larger distances. Another example of a low duty cycle wireless device 200 in accordance with the present invention includes an advertising display.

Figure 3:
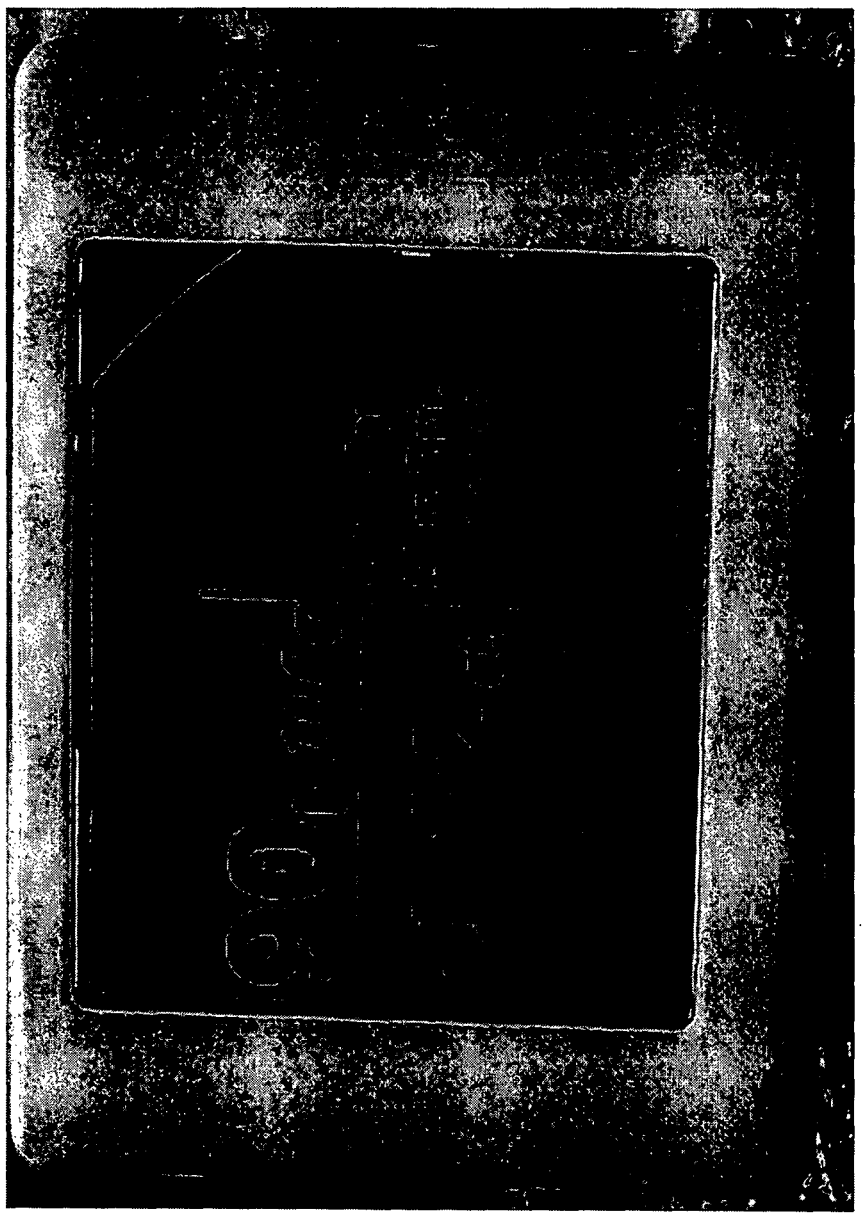
FIG. 3 shows an external view of an advertising display containing the components of FIG. 2 in accordance with the present invention.

FIG. 3 shows an external view of an advertising display 300 containing the components of FIG. 2 in accordance with the present invention. Advertising display 300 may be free standing or may mount onto a shelf. As shown in FIG. 3, although not drawn to scale, the display area is approximately 4×5 inches. The display may be suitably implemented with a dot matrix display having approximately 50-100 pixels/inch.

Figure 4:
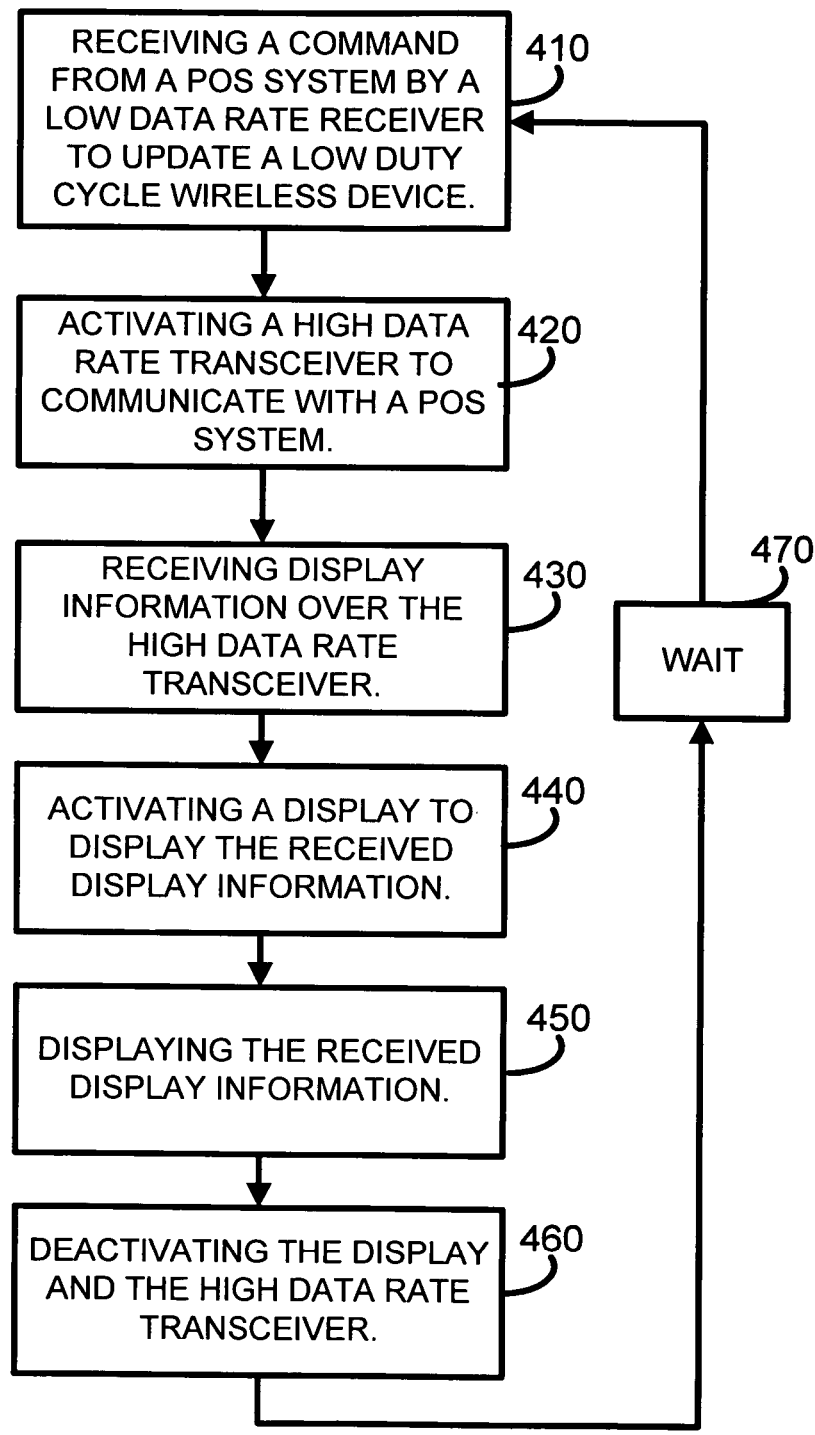
FIG. 4 shows a flow chart illustrating a method for communicating with a low duty cycle wireless device of FIG. 2 in accordance with the present invention.

FIG. 4 shows a flow chart illustrating a method for communicating with a low duty cycle wireless device 200 of FIG. 2 in accordance with the present invention. At step 410, a command is received by a low data rate receiver to update the wireless device's display such as display 240. For example, a host computer of a POS system such as computer 102 of POS system 116 may transmit a command to update the wireless device's display information. At step 420, a high data rate transceiver, such as high data rate transceiver 230, is activated to communicate with the POS system, for example. For example, microprocessor 220 may awake from a sleep state to signal the high data rate transceiver to communicate with the POS system. At step 430, display information is received over the high data rate transceiver. At step 440, a display, such as display 240, is activated to display the received display information. At step 450, the received display information is displayed. At step 460, the display and the high data rate transceiver are deactivated. Method 400 proceeds to a wait state 470 until the next command is received. During wait state 470, the display draws no power while the high data rate transceiver, low data rate receiver, and microprocessor draw minimal power while in sleep mode. Alternatively, the high data rate transceiver may be completely powered off during wait state 470. When the next command arrives, the method proceeds to step 410.

While the present invention has been disclosed in the context of various aspects of presently preferred embodiments, it will be recognized that the invention may be suitably applied to other environments consistent with the claims which follow.

We claim:
1. A low duty cycle wireless device comprising:
a high data rate transceiver;
a low data rate receiver for receiving a command to receive display information at the high data rate transceiver and, in response, producing a wake up signal; and
a microprocessor receiving the wake up signal and, in response, waking up from a sleep mode and activating the high data rate transceiver to receive the display information, the microprocessor deactivating the high data rate transceiver once the display information has been received.

2. The low duty cycle wireless device of claim 1 wherein the low data rate receiver acknowledges the received command utilizing a backscatter technique.

3. The low duty cycle wireless device of claim 1 wherein the low data rate receiver has an instantaneous data rate less than or equal to 16 kilobits per second and the high data rate receiver has an instantaneous data rate greater than or equal to 250 kilobits per second.

4. The low duty cycle wireless device of claim 1 further comprising:
a dot matrix display for displaying the display information.

5. The low duty cycle wireless device of claim 4 further comprising:
a memory for persistently storing the display of information.

6. The low duty cycle wireless device of claim 4, wherein the dot matrix display powers off after displaying the display information.

7. The low duty cycle wireless device of claim 4 is an electronic shelf label.

8. The low duty cycle wireless device of claim 4 is an advertising display.

9. A method for communicating with a low duty cycle wireless device having a display, the method comprising:
receiving a command by a low data rate receiver indicating display information needs to be received at a high data rate;
producing a wake up signal, in response to receiving the command;
activating a high data rate transceiver to receive the display information, in response to the wake up signal;
receiving the display information by the high data rate transceiver; and
deactivating the high data rate transceiver upon completion of receiving the display information.

10. The method of claim 9 further comprising:
displaying the display information by a display.

11. The method of claim 9 further comprising:
powering off the display after the display information is displayed.

12. The method of claim 9 wherein the low duty cycle wireless device is an electronic shelf label.

13. The method of claim 9 wherein the low duty cycle wireless device is an advertising display.

14. The method of claim 9 wherein the low data rate receiver has an instantaneous data rate less than or equal to 16 kilobits per second and the high data rate receiver has an instantaneous data rate greater than or equal to 250 kilobits per second.

15. The method of claim 9 wherein the low data rate receiver acknowledges the received command utilizing a backscatter technique.

16. A low duty cycle wireless device comprising:
a bi-stable display;
a high data rate transceiver;
a low data rate receiver for receiving a command to update the bi-stable display and producing a wake up signal; and a microprocessor, in response to the wake up signal, waking up from a sleep mode and activating the high data rate transceiver to receive display information, the microprocessor activating the bi-stable display to display the received display information, the microprocessor deactivating both the bi-stable display and the high data rate transceiver once the display information has been displayed.

17. The low duty cycle wireless device of claim 16 wherein the low data rate receiver acknowledges the received command utilizing a backscatter technique.

18. The low duty cycle wireless device of claim 16 wherein the low data rate receiver has an instantaneous data rate less than or equal to 16 kilobits per second and the high data rate receiver has an instantaneous data rate greater than or equal to 250 kilobits per second.

19. The low duty cycle wireless device of claim 16 is an electronic shelf label.

20. The low duty cycle wireless device of claim 16 is an advertising display.

* * * * *